United States Patent [19]

Yanagihara et al.

[11] 3,927,134
[45] Dec. 16, 1975

[54] PROCESS FOR PREPARATION OF DIISOPROPYLBENZENE

[75] Inventors: Tadahisa Yanagihara; Kentaro Fukahori, both of Shin-nanyo, Japan, 09181975

[73] Assignee: Toyo Soda Manufacturing Co., Ltd., Shin-nanyo, Japan

[22] Filed: Apr. 15, 1974

[21] Appl. No.: 460,929

[52] U.S. Cl. ..... 260/671 P; 260/668 A; 260/672 T; 260/674 A
[51] Int. Cl.² ............................................. C07C 3/52
[58] Field of Search......... 260/671 P, 672 T, 674 A, 260/668 A

[56] References Cited
UNITED STATES PATENTS

| | | | |
|---|---|---|---|
| 2,810,771 | 10/1957 | Odioso | 260/671 |
| 2,817,687 | 12/1957 | Enos | 260/671 |
| 2,818,452 | 12/1957 | Mavity | 260/671 |
| 2,839,591 | 6/1958 | Enos | 260/668 |
| 2,848,514 | 8/1958 | Keizer et al. | 260/671 |
| 2,883,438 | 4/1959 | Egbert | 260/671 |
| 3,184,517 | 5/1965 | Lee et al. | 260/671 |

*Primary Examiner*—Delbert E. Gantz
*Assistant Examiner*—C. E. Spresser
*Attorney, Agent, or Firm*—Oblon, Fisher, Spivak, McClelland & Maier

[57] ABSTRACT

Diisopropylbenzene is prepared from a cumene bottom which is a by-product formed in the preparation of cumene from benzene and propylene, by reacting said cumene bottom with propylene in the presence of an alkylation catalyst.

12 Claims, 2 Drawing Figures

3,927,134

PROCESS FOR PREPARATION OF DIISOPROPYLBENZENE

BACKGROUND OF THE INVENTION

1. Field of the Invention

This invention relates to a process for the preparation of m- and/or p-diisopropylbenzene in high yield from a cumene bottom, which is a bottom prepared as a by-product in a process for producing cumene by reacting benzene with propylene. The product can be prepared by fractional distillation, isomerization or other treatment of the bottom (hereinafter referred to simply as cumene bottom).

2. Description of the Prior Art

It is known that cumene or diisopropylbenzene can be prepared by reacting benzene with propylene or with poly-isopropylbenzene in the presence of an alkylation catalyst which is reactive under acidic conditions. However, the cumene bottom prepared by the process contains various impurities having boiling points near the boiling point of diisopropylbenzene. The distillation of diisopropylbenzene from the cumene bottom is thus quite difficult and uneconomical.

SUMMARY OF THE INVENTION

Accordingly, it is one object of this invention to provide a process for the preparation of diisopropylbenzene in high yield from a cumene bottom, by economically removing impurities.

This and other objects of the invention as will hereinafter become more readily understood by the following description can be attained by reacting the cumene bottom with propylene in the presence of an alkylation catalyst so as to substantially remove such impurities from the cumene bottom, as t-butylbenzene (hereinafter referred to as t-BB), secbutylbenzene (hereinafter reffered to as s-BB), t-amylbenzene (hereinafter referred to as t-AB), 2-methyl-butylbenzene (hereinafter referred to as MBB), 2-methyl-2-phenylpentane (hereinafter referred to as MPP), 2-phenylhexane (hereinafter referred to as 2-PH) and 3-phenyl-hexane (hereinafter referred to as 3-PH), and to isomerize o-diisopropylbenzene (hereinafter referred to as o-DIPB) to m- and p-DIPB. Amounts of benzene, cumene, m-diisopropylbenzene (hereinafter referred to as m-DIPB), p-diisopropylbenzene (hereinafter referred to as p-DIPB) or triisopropylbenzene (hereinafter referred to as TIPB) may be admixed with the catalyst. By the process of this invention, the cumene bottom is converted to benzene, cumene, m-DIPB, p-DIPB, TIPB, and high boiling point materials (hereinafter referred to as HB), and m- and/or p-DIPB are distilled in high yields. The residue of the reaction products from which m- or p-DIPB is distilled, can be further admixed with benzene, cumene or TIPB and the resulting mixture reacted in the presence of the alkylation catalyst to isomerize m-DIPB to m- and p-DIPB or p-DIPB to m- and p-DIPB as step C, and the reaction mixture can be recycled to step A for the conversion of impurities, or to step B for the distillation of m- and p-DIPB. The distillation residue of the reaction products can also react alone in the presence of the alkylation catalyst, and the reaction mixture recycled to one of the preceding steps.

DETAILED DESCRIPTION OF THE INVENTION

The m- and p-DIPB are quite important intermediates in organic synthesis. Resorcinol and hydroquinone can be prepared by oxidizing m- and p-DIPB with air and decomposing the resulting dihydroperoxide with an acid.

Polyisopropylbenzene having at least 3 isopropyl groups can be used as a propylene source.

The important intermediates m- and p-DIPB may be prepared economically and in high yield from the cumene bottom obtained as a by-product in the preparation of cumene from benzene and propylene. In order to illustrate the invention, one example of the formulation of the cumene bottom is shown in Table 1. The formulation is only one example and is not to be construed as limiting of the invention. Cumene bottoms having varous formulations can be used in the process of this invention.

Table 1

| Component | Formulation of a Cumene Bottom | |
|---|---|---|
| | Weight % | Boiling point (°C) |
| Cumene | 9.6 | 152.5 |
| t-BB | 2.8 | 169.3 |
| s-BB | 1.2 | 172.5 |
| t-AB | 0.4 | 192.4 |
| MBB | 2.6 | 197 |
| m-DIPB | 26.3 | 203.2 |
| o-DIPB | 11.5 | 203.8 |
| p-DIPB | 28.1 | 210.3 |
| MPP | 7.5 | 205 – 206 |
| 2-PH | 4.3 | 210 – 211 |
| 3-PH | 5.7 | 209 – 212 |

As may be seen from Table 1, the boiling points of MPP, 2-PH and 3-PH are near the boiling point of p-DIPB. Accordingly it is impossible to economically separate p-DIPB and/or m-DIPB from the cumene bottom by simple distillation. By the process of this invention, m- and p-DIPB may be separated from the cumene bottom and MPP, 2-PH and 3-PH, which have boiling points quite near the boiling point of m- and p-DIPB, can easily be nonvolatilized by reacting the cumene bottom with propylene in the presence of an alkylation catalyst. Benzene, cumene, m-DIPB, p-DIPB or TIPB can be optionally added to the catalyst. The impurities t-BB, s-BB, t-AB, MBB,MPP, 2-PH and 3-PH are substantially nonvolatilized and o-DIPB is isomerized to m- and p- DIPB, so as to provide a mixture of benzene, cumene, m-DIPB, p-DIPB, TIPB and HB.

The process is quite significant from an economical viewpoint. The reaction mixture composed of benzene, cumene, m-DIPB, p-DIPB, TIPB and HB obtained in step A can be separated by distillation step B to obtain m- and/or p-DIPB. The distillation residue of the reaction mixture from which the m- or p-DIPB are removed, is further admixed with benzene, cumene, or TIPB and the mixture is treated in the presence of an alkylation catalyst to isomerize m-DIPB to m- and p-DIPB or p-DIPB to m- and p-DIPB in step C. The resulting reaction mixture is then recycled to step A or step B, whereby the yield of m- and/or p-DIPB from the cumene bottom is further increased. The mechanism of removal of the MPP, 2-PH and 3-PH impurities is not clear, however they are probably converted to high boiling point materials (unknown formula).

Figure 1:
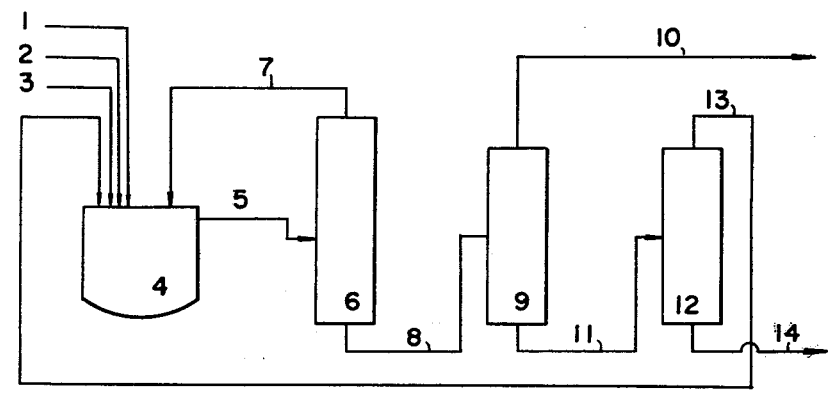
FIG. 1 is a schematic diagram of one embodiment of the process for preparation of p-DIPB from the cumene bottom.

In order to illustrate this invention in further detail, a schematic diagram of one embodiment of the process for the preparation of p-DIPB from the cumene bottom is shown in FIG. 1 wherein the cumene bottom is fed through passage (1), propylene is fed through passage 2, a catalyst is fed through a passagee 3, benzene, cumene and m-DIPB are fed through a passage 7 and TIPB is fed through a passage 13, to a reactor 4. Benzene, cumene and m-DIPB are distilled from the top of the distilling column 6 and are recycled to the reactor 4. p-DIPB, TIPB and HB are obtained from the bottom of the distilling tower 6 and are fed through passage 8 to the distilling tower 9. The desired p-DIPB is obtained from the top of the distilling tower 9 and TIPB and HB are obtained from the bottom of the distilling tower 9. TIPB and HB are fed through a passage 11 to the distilling tower 12. TIPB is distilled from the top of the distilling tower 12 and is recycled through a passage 13 to the reactor 4. HB is obtained from the bottom, and is discharged through passage 14 to a waste liquid storage tank. A part of all of TIPB fed to the reactor 4 can be replaced by HB. Thereupon, it is necessary to use the distilling tower 12 and the TIPB and HB obtained from the distilling tower 9 are fed to the reactor 4 after removing a part of the TIPB and HB. p-DIPB can be obtained in high yield from the cumene bottom by recycling benzene, cumene, m-DIPB and TIPB to the reactor 4. The above-mentioned process can be easily modified for the preparation of m-DIPB from the cumene bottom, by recycling p-DIPB instead of m-DIPB. It should be readily understood that a high ratio of m-DIPB to p-DIPB may be prepared from the cumene bottom. The amount of m- or p-DIPB recycled is dependent upon the ratio of m-DIPB to p-DIPB prepared. When the m-DIPB/p-DIPB ratio obtained in the impurity conversion step and the isomerization step is high, it is unnecessary to recycle m-DIPB and p-DIPB and only benzene, cumene, and TIPB need to be recycled.

Suitable alkylation catalysts which may be used in the impurity conversion step and the isomerization step include Friedel-Crafts type catalysts, such as aluminum chloride, phosphoric acid type solid catalysts, sulfuric acid, aluminum silicate, boron fluoride and any catalyst which is active in alkylations.

The cumene bottom employed in the conversion step can be the original cumene bottom or the residue of a cumene bottom from which cumene, t-BB, s-BB, t-AB and MPB have been distilled.

The amounts of propylene, benzene, cumene, m- or p-DIPB and TIPB are dependent upon the reaction conditions, and the amounts of MPP, 2-PH and 3-PH impurities in the cumene bottom. For example, when p-DIPB is prepared from the cumene bottom having the formulation in Table 1, at 60°C in the presence of $AlCl_3$, it is suitable to add the following proportions of reagents, expressed as molar ratios to the total o-, m- and p-DIPB in the cumene bottom:

Propylene, 1.0–1.5; benzene, 0.2–0.4; cumene, 0.7–1.3; m-DIPB 1–2; and TIPB 0.6–1.1. The reaction temperature will vary depending upon the conditions. Suitable reaction pressures are atmospheric pressure or lower or higher pressure. Atmospheric pressure is preferred from an economic standpoint.

Figure 2:
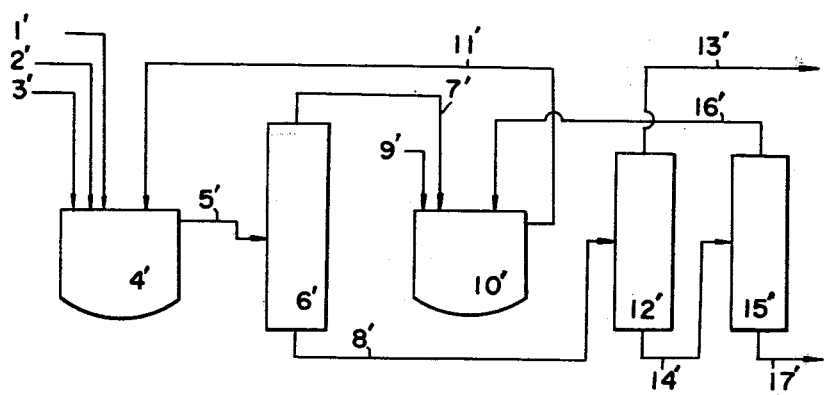
FIG. 2 is a schematic diagram of the other embodiment of the process for preparation of p-DIPB from the cumene bottom.

A schematic diagram of the other embodiment of the process for the preparation of p-DIPB from a cumene bottom is shown in FIG. 2 wherein the cumene bottom is fed through a passage 1', propylene is fed through a passage 2', a catalyst is fed through a passage 3, and benzene, cumene and m-DIPB, p-DIPB and TIPB are fed through a passage 11' to a reactor 4'. After reacting the compounds, the reaction mixture is fed through a passage 5' to a distilling column 6'. Benzene, cumene and m-DIPB are distilled from the top of the distilling column 6' and are fed through a passage 7' to a second reactor 10'. p-DIPB, TIPB and high boiling point products, HB, are obtained from the bottom of the distilling column 6' and are fed through a passage 8' to a second distilling column 12'. The desired p-DIPB is obtained from the top of distilling column 12'. TIPB and HB are obtained from the bottom of the distilling column 12' and are fed through a passage 14' to a third distilling column 15' and is fed through a passage 16' to reactor 10'. HB is obtained from the bottom of distilling column (15'). The catalyst is fed through a passage (9') to the reactor (10') so as to react the contents and the reaction mixture is recycled through a passage 11' to the reactor 4'. A part or all of TIPB fed to the reactor 10' can be replaced by HB. Thereupon, it is unnecessary to use the distilling column 15' and the TIPB and HB obtained from the bottom of the distilling column 12' are fed to the reactor 10' after removing a part thereof.

The above-mentioned process can be modified for preparing m-DIPB, rather than p-DIPB. It should be easily understood that a high ratio of m-DIPB to p-DIPB may be prepared from the cumene bottom. If a desirable ratio of m-DIPB to p-DIPB is obtained by step A, it is unnecessary to apply step C.

Suitable alkylation catalysts which may be used in step A and step C include Friedel-Crafts type catalysts, such as aluminum chloride, phosphoric acid type solid catalyst, sulfuric acid, aluminum silicate, boron fluoride and any catalyst which is active in alkylations. The cumene bottom, fed to step A can be the original cumene bottom or a cumene bottom residue from which cumene, t-BB, s-BB, t-AB and MPB have been distilled.

The amounts of propylene, benzene, cumene, m- or p-DIPB and TIPB added to the cumene bottom in step A and the amounts of benzene, cumene and TIPB added in step C will vary depending upon the reaction conditions and the amounts of impurities, e.g., MPP, 2-PH and 3-PH, in the cumene bottom. For example, when p-DIPB is prepared from the cumene bottom having the formulation in Table 1, at 60°C in the presence of aluminum chloride catalyst in both step A and step B, it is suitable to add the following proportions of reagents, expressed as molar ratios to total DIPB isomers in step A: propylene, 1.0; benzene 0.2 – 0.4; cumene, 0.7 – 1.3; m-DIPB or p-DIPB, 1 – 2; and TIPB 0.6 – 1.1. The reaction temperature will vary depending on conditions and the reaction pressure can be atmospheric pressure or a lower or higher pressure, preferably atmospheric pressure from an economic standpoint.

Having generally described this invention, a further understanding can be obtained by reference to certain specific examples which are provided herein for purposes of illustration only and are not intended to be limiting unless otherwise specified.

EXAMPLE 1

A 5 liter separable flask was charged with 492.4 g of the cumene bottom having the formulation in Table 1

(containing 2 mole of DIPB components), 58.5 g (0.75 mole) of benzene, 313.0 g (2.61 mole) of cumene, 649.1 g (4 mole) of m-DIPB, 453.7 g (2.22 mole) of TIPB, 133.4 g (1 mole) of anhydrous aluminum chloride and 18.3 g (0.5 mole) of hydrogen chloride. The flask was immersed in a water bath and 65.5 g (1.56 mole) of propylene was gradually introduced with stirring to initiate reaction. The reaction mixture was kept at 70°C for 3 hours with stirring to complete the reaction and then the mixture was kept unstirred for an additional two hours. The reaction products were separated from the catalyst layer, washed once with water and 5 percent aqueous sodium hydroxide and distilled to obtain 57.5 g of benzene, 361 g of cumene, 649 g of DIPB, 452 g of TIPB, 4.3 g of 2-PH and a trace of MPP. The residue contained 187.5 g of HB.

EXAMPLE 2

The procedure of Example 1 was repeated, except that the amounts of materials were changed to 984.8g of comene bottom and 58.5 g (0.75 mole) of benzene, 268.0 g (2.23 mole) of cumene, 324.6 g (2 mole) of p-DIPB, 346.2 g of HB, 133.4 g (1 mole) of anhydrous aluminum chloride, 18.3 g (0.5 mole) of hydrogen chloride and 131 g (3.12 mole) of propylene were added. The reaction produced 59 g of benzene, 362 g of cumene, 650 g of m-DIPB, 322 g of p-DIPB, 12.3 g of 2-PH and a trace of MPP. The residue contained 721 g of HB.

EXAMPLE 3

The cumene bottom of Example 1 was distilled to remove cumene, t-BB, s-BB, t-AB and MPB and to obtain a bottom oil (containing 2 mole of DIPB components). The procedure of Example 1 was repeated except that the amount of materials in the bottom oil (containing 2 mole of DIPB components) was changed to 410.3 g and 58.5 g (0.75 mole) of benzene, 363.0 g (3.03 mole) of cumene, 649.1 g (4 mole) of m-DIPB, 504.8 g (2.47 mole) of TIPB, 133.4 g (1 mole) of anhydrous aluminum chloride, 18.3 g (0.5 mole) of hydrogen chloride, and 44.6 g (1.06 mole) of propylene were added. The reaction produced 58 g of benzene, 362 g of cumene, 652 g of m-DIPB, 320 g of p-DIPB, 505 g of TIPB, 2.6 g of 2-PH and trace of MPP. The residue contained 127 g of HB.

EXAMPLE 4

A 5 liter separable flask was charged with 411.4 g of the cumene bottom having the formulation in Table 1 (containing 2 moles of total DIPB), 36.0 g (0.46 mole) of m-DPIB, 337.2 g (1.65 mole) of TIPB, 50.0 g (0.375 mole) of anhydrous aluminum chloride, and 13.7 g (0.375 mole) of hydrogen chloride. The flask was immersed in an oil bath and 68.5 g (1.63 mole) of propylene was gradually introduced with stirring to initiate reaction. The reaction mixture was kept at 90°C for 3 hours with stirring to complete the reaction and then kept unstirred for 2 hours. The reaction products were separated from the catalyst layer, washed once with water and 1 percent aqueous sodium hydroxide, and distilled to obtain 34 g of benzene, 359 g of cumene, 652 g of m-DIPB, 323 g of p-DIPB, 335 g of TIPB, 3.0 g of 2-PH and a trace of MPP. The residue contained 186 g of HB.

EXAMPLE 5

The procedure of Example 4 was repeated, except that the amount of material in the cumene bottom was changed to 822.8 g, and 36 g (0.46 mole) of benzene, 360 g (3.0 mole) of cumene, 324.6 g (2 mole) of p-DIPB, 346.2 g of HB, 100 g (0.75 mole) of anhydrous aluminum chloride, 27.4 g (0.75 mole) of hydrogen chloride, and 137 g (3.26 mole) of propylene were added. The reaction produced 3.5 g of benzene, 361 g of cumene, 652 g of m-DIPB, 320 g of p-DIPB, 4.5 g of 2-PH and a trace of MPP. The residue contained 729 g of HB.

EXAMPLE 6

A 5 liter separable flask was charged with 492.4 g of the cumene bottom having the formulation in Table 1 [containing 324.6 g (2 mole) of DIPB components and 20.9 g of 2-PH], 58.5 g (0.75 mole) of benzene, 313.0 g (2.61 mole) of cumene, 428.4 g (2.64 mole) of m-DIPB, 220.7 g (1.36 mole) of p-DIPB, 453.7 g (2.22 mole) of TIPB, 66.7 g (0.5 mole) of anhydrous aluminum chloride and 18.3 g (0.5 mole) of hydrogen chloride. The flask was immersed in a water bath and 65.5 g (1.56 mole) of propylene was gradually introduced with stirring to initiate reaction. The reaction mixture was kept at 70°C for 30 minutes with stirring to complete the reaction and was kept unstirred for an additional 2 hours. The reaction products were separated from the catalyst layer, washed once with water and 5% aqueous sodium hydroxide (step A). The reaction products were distilled to obtain 378.8 g (2.33 mole) of p-DIPB, 57.5 g (0.74 mole) of benzene, 361 g (3.01 mole) of cumene, 595 g (3.67 mole) of m-DIPB, 454 g (2.22 mole) of TIPB, 4.7 g of 2-PH and a trace of MPP. The residue contained 185 g of HB (step B).

The fractions from step B except p-DIPB, 2-PH and the residue HB, were added to the 5 liter separable flask together with 133.4 g (1 mole) of anhydrous aluminum chloride and 36.6 g (1 mole) of hydrogen chloride. The mixture was stirred at room temperature for 3 hours to complete the reaction, and was kept unstirred for an additional 2 hours. The reaction products were separated from the catalyst layer, washed once with water and 5 percent aqueous sodium hydroxide, and distilled to obtain 233.7 g (1.44 mole) of p-DIPB, 15.6 g (0.20 mole) of benzene, 390 g (3.25 mole) of cumene, 546.9 g (3.37 mole) of m-DIPB, 282 g (1.38 mole) of TIPB (step C).

EXAMPLE 7

A 5 liter separable flask was charged with 1477 g of the cumene bottom having the formulation in Table 1 [containing 973.7 g (6 mole) of DIPB components and 62.7 g of 2-PH], 66.7 g (0.5 mole) of anhydrous aluminum chloride and 18.3 g (0.5 mole) of hydrogen chloride. The flask was immersed in a water bath, and 196.5 g (4.68 mole) of propylene was gradually introduced with stirring to initiate reaction. The reaction mixture was kept at 70°C for 30 minutes with stirring to complete the reaction, and was kept unstirred for an additional 2 hours. The reaction products were separated from the catalyst layer, washed once with water and 5 percent aqueous sodium hydroxide (step A). The reaction products were distilled to obtain 340.8 g (2.10 mole) of p-DIPB, 11.7 g (0.15 mole) of benzene, 28.8 g (0.24 mole) of cumene, 482 g (2.97 mole) of m-DIPB, 110.4 g (0.54 mole) of TIPB, 10.5 g of 2-PH and a trace of MPP. The residue contained 564 g of HB (step B). The fractions of step B except the p-DIPB, 2-PH and the residue HB, were admixed with 90 g (0.75 mole) of cumene, 92.0 g (0.45 mole) of TIPB, 133.4 g (1 mole) of anhydrous aluminum chloride catalyst and 36.6 g (1 mole) of hydrogen chloride in the 5 liter separable flask, the mixture was stirred at room temperature for 3 hours to complete the reaction, and was kept unstirred for an additional 2 hours.

The reaction products were separated from the catalyst layer, were washed once with water and 5 percent aqueous sodium hydroxide, and distilled to obtain 149.3 g (0.92 mole) of p-DIPB, 11.7 g (0.15 mole) of benzene, 115.2 g (0.96 mole) of cumene, 316.4 g (1.95 mole) of m-DIPB and 194.0 g (0.95 mole) of TIPB (step C).

EXAMPLE 8

A 5 liter separable flask was charged with 492.4 g of the cumene bottom having the formulation in Table 1 [containing 324.6 (2 mole) of DIPB components and 20.9 g of 2-PH], 58.5 g (0.75 mole) of benzene, 313.0 g (2.61 mole) of cumene, 428.4 g (2.64 mole) of m-DIPB, 220.7 g (1.36 mole) of p-DIPB, 453.7 g (2.22 mole) of TIPB, 66.7 g (0.5 mole) of anhydrous aluminum chloride and 18.3 g (0.5 mole) of hydrogen chloride. The flask was immersed in a water bath, and 65.5 g (1.56 mole) of propylene was gradually introduced with stirring to initiate reaction. The reaction mixture was kept at 30°C for 30 minutes with stirring to complete reaction, and was kept unstirred for an additional 2 hours. The reaction products were separated from the catalyst layer, washed once with water and 5% aqueous sodium hydroxide (step A). The reaction products were distilled to obtain 681.6 g (4.20 mole) of m-DIPB, 56 g (0.72 mole) of benzene, 364 g (3.03 mole) of cumene, 292 g (1.80 mole) of p-DIPB, 460 g (2.25 mole) of TIPB, 7.5 g of 2-PH and a trace of MPP. The residue contained 181 g of HB (step B). The fractions from step B except m-DIPB and the residue HB, were admixed with 133.4 g (1 mole) of anhydrous aluminum chloride catalyst and 36.6 g (1 mole) of hydrogen chloride in the 5 liter separable flask, the mixture was stirred at room temperature for 3 hours to complete reaction, and was kept unstirred for an additional 2 hours. The reaction products were separated from the catalyst layer, washed once with water and 5 percent aqueous sodium hydroxide and distilled to obtain 348.9 (2.15 mole) of m-DIPB, 11.7 g (0.15 mole) of benzene, 369.6 g (3.08 mole) of cumene, 207.7 g (1.28 mole) of p-DIPB, 243.2 g (1.19 mole) of TIPB and 4.8 g of 2-PH (step C).

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for the preparation of diisopropylbenzene from crude diisopropylbenzene containing as impurities 2-methyl-2-phenylpentane, 2-phenylhexane and 3-phenylhexane, a by-product formed in the preparation of cumene from benzene and propylene, which comprises reacting said impurities in said crude diisopropylbenzene with propylene in the presence of an alkylation catalyst while isomerizing all o-diisopropylbenzene in said crude diisopropylbenzene to m- and p-diisopropylbenzene; and distilling said diisopropylbenzene from the reaction mixture.

2. The process for preparing diisopropylbenzene as in claim 1, wherein said reaction of crude diisopropylbenzene and propylene is conducted in the presence of added amounts of at least one compound selected from the group consisting of benzene, cumene, m-diisopropylbenzene, p-diisopropylbenzene and triisopropylbenzene.

3. The process for preparing diisopropylbenzene as in claim 1, wherein the reaction mixture is distilled to separate an isomer of diisopropylbenzene selected from the group consisting of the m- and p-isomers, the residue is reacted in the presence of an alkylation catalyst and the resulting reaction mixture is redistilled to recover additional amounts of one of said isomers.

4. The process for preparing diisopropylbenzene as in claim 3, wherein said reaction of the residue is effected in the presence of added amounts of a compound selected from the group consisting of benzene, cumene and triisopropylbenzene.

5. The process for preparing diisopropylbenzene as in claim 1, wherein the alkylation catalyst is selected from the group consisting of Friedel-Crafts catalysts, phosphoric acid solid catalysts, sulfuric acid aluminum silicate and boron fluoride.

6. The process for preparing diisopropylbenzene as in claim 5, wherein the Friedel-Crafts catalyst is aluminum chloride and hydrogen chloride.

7. The process for preparing diisopropylbenzene as in claim 1, wherein 2-methyl-2-phenylpentane, 2-phenylhexane and 3-phenylhexane, which have boiling points quite close to the boiling point of m- and p-diisopropylbenzene, are eliminated by reacting the crude diisopropylbenzene with propylene in the presence of an alkylation catalyst.

8. The process for preparing diisopropylbenzene as in claim 3, wherein o- and m-diisopropylbenzene are isomerized to p-diisopropylbenzene by reacting the residue obtained from said distillation to separate an isomer of diisopropylbenzene selected from the group consisting of the m- and p-isomers in the presence of an alkylation catalyst.

9. The process for preparing diisopropylbenzene as in claim 8, wherein said reaction of the residue is effected in the presence of added amounts of a compound selected from the group consisting of benzene, cumene and triisopropylbenzene.

10. The process for preparing diisopropylbenzene as in claim 3, wherein o- and p-diisopropylbenzene are isomerized to m-diisopropylbenzene by reacting the residue obtained from said distillation to separate an isomer of diisopropylbenzene selected from the group consisting of the o- and p-isomers in the presence of an alkylation catalyst.

11. The process for preparing diisopropylbenzene as in claim 10, wherein said reaction of the residue is effected in the presence of added amounts of a compound selected from the group consisting of benzene, cumene and triisopropylbenzene.

12. The process for preparing diisopropylbenzene as in claim 1, wherein the crude diisopropylbenzene is reacted with polyisopropylbenzene, having at least 3 isopropyl groups as a propylene source in the presence of an alkylation catalyst to eliminate 2-methyl-2-phenylpentane, 2-phenylhexane and 3-phenylhexane.

* * * * *